US 12,241,822 B2

(12) United States Patent
Bouchalkha et al.

(10) Patent No.: US 12,241,822 B2
(45) Date of Patent: Mar. 4, 2025

(54) SYSTEM AND METHOD FOR SELECTIVE ION MONITORING

(71) Applicant: Khalifa University of Science and Technology, Abu Dhabi (AE)

(72) Inventors: Abdellatif Bouchalkha, Abu Dhabi (AE); Radouane Karli, Abu Dhabi (AE); Khalid Alhammadi, Abu Dhabi (AE); Mohammed Serhan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 742 days.

(21) Appl. No.: 17/600,890

(22) PCT Filed: Mar. 25, 2020

(86) PCT No.: PCT/IB2020/052789
§ 371 (c)(1),
(2) Date: Oct. 1, 2021

(87) PCT Pub. No.: WO2020/208452
PCT Pub. Date: Oct. 15, 2020

(65) Prior Publication Data
US 2022/0196592 A1  Jun. 23, 2022

Related U.S. Application Data

(60) Provisional application No. 62/830,714, filed on Apr. 8, 2019.

(51) Int. Cl.
*G01N 15/06* (2024.01)
*G01N 15/10* (2024.01)
*G01N 21/65* (2006.01)

(52) U.S. Cl.
CPC ..... *G01N 15/06* (2013.01); *G01N 2015/0687* (2013.01); *G01N 2015/1026* (2024.01); *G01N 21/65* (2013.01)

(58) Field of Classification Search
None
See application file for complete search history.

(56) References Cited

U.S. PATENT DOCUMENTS 10,684,249 B2 *  6/2020  Gunasekaran ....... G01N 27/302
10,900,927 B2 *  1/2021  Walsh ................. G01N 27/414
(Continued)

FOREIGN PATENT DOCUMENTS

WO  2013141692 A1  9/2013
WO  2015085074 A1  6/2015

OTHER PUBLICATIONS

Search Report and Written Opinion for PCT Application No. PCT/IB2020/052789 mailed on Jun. 18, 2020.
(Continued)

*Primary Examiner* — Son T Le
*Assistant Examiner* — Jermaine L Jenkins
(74) *Attorney, Agent, or Firm* — Billion & Armitage

(57) ABSTRACT

There is provided a system and method of selectively monitoring ions in a fluid medium using a graphene sensor, the method comprising the step of adjusting an operating frequency of the graphene sensor to a particular resonant frequency for targeting resonance of specific ions in the fluid medium. In the proposed method, dispersive effect of the fluid medium is used to tune the graphene sensor to a desired frequency, thereby obtaining resonance response for specific ions in the fluid medium. Also, the monitoring of a specific ion in the fluid medium is unaffected by presence of a plurality of other ions in the said fluid medium.

20 Claims, 4 Drawing Sheets

(56) References Cited

U.S. PATENT DOCUMENTS

2013/0018599 A1    1/2013   Peng
2015/0276677 A1    10/2015  Li et al.
2017/0181669 A1    6/2017   Lin et al.
2021/0285905 A1*   9/2021   Hillebrand ............. G01N 33/18

OTHER PUBLICATIONS

Bouchalkha, Abdellatif, et al., "Graphene based sensor for scale monitoring", Society of Exploration Geophysicists, RDPETRO 2018: Research and Development Petroleum Conference and Exhibition, Abu Dhabi, UAE, May 9-10, 2018, https://doi.org/ 10.1190/ RDP2018-41995526.1 Chapter "Experimental results and discussion".

Sharma, Ankur, et al., "Electronic applications of graphene mechanical resonators", IET Circuits Devices Syst., pp. 1-7, Nov. 1, 2015.

* cited by examiner

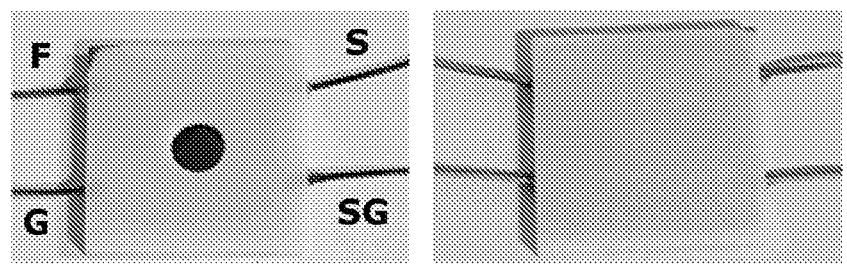
FIG. 3(a)  FIG. 3(b)
FIGURE 3
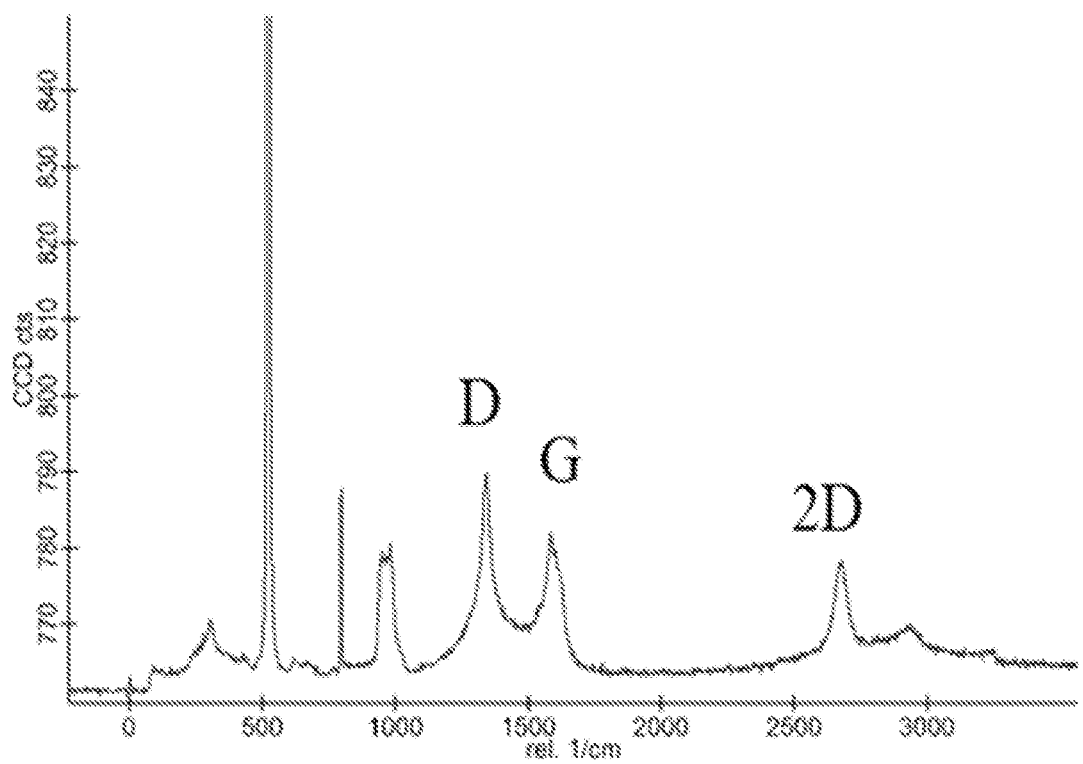
FIGURE 4

SYSTEM AND METHOD FOR SELECTIVE ION MONITORING

This application is a U.S. National Stage Application (371) of PCT Application No. PCT/IB2020/052789, filed on Mar. 25, 2020, which claims the benefit of U.S. Provisional Application No. 62/830,714, filed on Apr. 8, 2019, the benefit of priority of which is claimed hereby, and which is incorporated by reference herein in its entirety.

FIELD OF THE INVENTION

The present invention relates to the field of ion monitoring, and more particularly to a system and method for selectively monitoring ions using a graphene sensor.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Considering the ever growing requirements for advancements in medical fields it is essential to identify or detect both presence and quantities of ions of chemical elements in diluted fluids such as blood. Accordingly, huge efforts are being introduced and much effort has been expended in the search for improvements in monitoring apparatuses for this purpose.

However, sensors get old and require replacements very often subsequent to short periods of use. Further, in most cases, is limited to use a single type of sensor for one type of ion. Traditional technologies or systems being used for detection or monitoring of ions within a fluid are very limited and non-efficient. US20130018599A1 is based on a change in graphene conductance and a structural or material change in a graphene flake, leading to a change in a conductivity of the graphene flake, with no selectivity of the detection of specific ions in the presence of many other ions. US20150276677A1 is based on detection of ions in a low pressure gas environment and is not capable of working in liquid environments comprising many different ions. Also, this system has no selectivity during detection of specific ions in the presence of many other ions. US20170181669A1 wherein an analyte is modified by combining to it in a fluid or sample. The selectivity between sensing ions in this system is based on having specific receptors and accordingly specific conductance elements for ion detection.

WO2013141692A1 discloses an apparatus and method for detecting ions of heavy metallic elements using a polymeric binder to detect specific ions through a method of chemical bonding with an ionophore. The sensor being employed in this case needs to be re-designed each time for detecting a specific type of ion.

Accordingly, there exists a need to provide a more efficient and flexible system and method for the selective monitoring of ions in a medium.

SUMMARY OF THE INVENTION

Therefore it is an object of the present invention to provide a system for selectively monitoring ions in a fluid using a graphene sensor.

The present invention involves a method of selectively monitoring ions in a fluid medium using a sensor, the method comprising the step of adjusting an operating frequency of the sensor to a particular resonant frequency for targeting resonance of specific ions in the fluid medium.

In an embodiment of the present invention, a quality of the sensor is tested using Raman techniques.

In another embodiment, dispersive effect of the fluid medium is used to tune the sensor to a desired frequency, thereby obtaining resonance response for specific ions in the fluid medium.

In another embodiment of the present invention, monitoring of a specific ion in the fluid medium is unaffected by presence of a plurality of other ions in the said fluid medium.

In another embodiment of the present invention, selective monitoring of strontium (Sr++) ions is performed in the presence of the plurality of other ions in the said fluid medium.

In another embodiment of the present invention, the operating frequency of the sensor is tuned to a frequency within 100 to 200 kHz, for selectively monitoring strontium (Sr++) ions in the presence of the plurality of other ions in the said fluid medium.

In another embodiment of the present invention, the sensor is tuned to different resonant frequencies for monitoring different ions in the fluid medium, and is used to scan and record a frequency response of the fluid medium containing the plurality of other ions.

In another embodiment of the present invention, tuning of the sensor is done electrically or mechanically.

In another embodiment of the present invention, a single sensor is used for monitoring different ions in the fluid medium by simply tuning the sensor to a different frequency.

As another aspect of the present invention, a device for selectively monitoring a plurality of different ions present in a fluid medium is proposed, the device comprising a graphene sensor wherein the graphene sensor is tuned to different frequencies for selectively monitoring the plurality of different ions present in the fluid medium.

In an embodiment of the present invention, tuning the sensor comprises adjusting an operating frequency of the sensor.

In another embodiment of the present invention, resonance frequency of a dielectric medium of the fluid medium is used as excitation frequency for tuning the graphene sensor, thereby enabling the graphene sensor to selectively monitor the plurality of different ions present in the fluid medium.

In another embodiment of the present invention, the graphene sensor is packaged by externally exposing sensing material on top of the graphene sensor.

In another embodiment of the present invention, a quality of the graphene sensor is tested using Raman techniques.

In another embodiment of the present invention, a single sensor is used for monitoring the plurality of different ions present in the fluid medium by simply tuning the graphene sensor to a different frequency.

As a further aspect of the present invention, a system for selectively monitoring different ions present in a fluid medium is proposed, the system comprising a graphene sensor for selectively monitoring the different ions present in the fluid medium and a user interface for graphically displaying the different ions present in the fluid medium, wherein the graphene sensor is tuned to different frequencies for selectively monitoring the different ions present in the fluid medium.

In an embodiment of the present invention, monitoring of a specific ion in the fluid medium is unaffected by presence of a plurality of other ions in the said fluid medium.

In another embodiment of the present invention, the graphene sensor is tuned to different resonant frequencies for monitoring different ions in the fluid medium, and is used to scan and record a frequency response of the fluid medium containing the plurality of other ions.

In another embodiment of the present invention, tuning the graphene sensor comprises adjusting an operating frequency of the graphene sensor.

In another embodiment of the present invention, tuning of the graphene sensor is done electrically or mechanically.

In another embodiment of the present invention, the user interface graphically displays a variation of specific ion concentrations within the fluid medium.

In another embodiment of the present invention, the selective monitoring of different ions present in the fluid medium is conducted online.

In another embodiment of the present invention, the user interface is a screen on a host computer or a mobile device.

As a further aspect of the present invention, a method of manufacturing a sensor for selectively monitoring ions in a fluid medium is proposed, the method comprising the steps of depositing a thin layer of silicon dioxide on a silicon substrate for electrical insulation, preparing a graphene flake and then depositing the prepared graphene flake on the silicon substrate coated with the thin layer of silicon dioxide.

In an embodiment of the present invention, the graphene flake is prepared using Metal Oxide Chemical Vapor Deposition (MOCVD) technique.

In another embodiment of the present invention, the method further comprises depositing a plurality of metallic electrodes on the thin layer of silicon dioxide deposited on the silicon substrate and depositing a layer of insulating material covering a plurality of metal contacts located on the plurality of metallic electrodes.

In another embodiment of the present invention, the plurality of metallic electrodes are made of titanium-aluminum alloy as ohmic contacts.

In another embodiment of the present invention, sensitivity of the sensor depends on a dielectric material of the fluid medium.

In another embodiment of the present invention, the sensor is sealed and packaged with a window exposing sensing material to an outside medium.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which—

FIGS. 3(a) and 3(b) show a top view and bottom view, respectively, of the sensor being employed in the present invention.

FIG. 4 is a graphical representation of the Raman spectra of the graphene sensor after packaging in accordance with the present invention.

DETAILED DESCRIPTION OF THE INVENTION

The aspects of the method or system to provide a system for selectively monitoring ions in a fluid medium according to the present invention will be described in conjunction with FIGS. 1-6. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The proposed system and method aims at selectively detecting and monitoring a plurality of ions, which are of different elements or types, from within a fluid solution. This method is implemented using a simple graphene sensor. A resonance frequency of the dielectric medium of the fluid solution is used as the excitation frequency for tuning the graphene sensor, thereby enabling the graphene sensor to detect specific ions within a fluid medium comprising of different ions.

Figure 1:
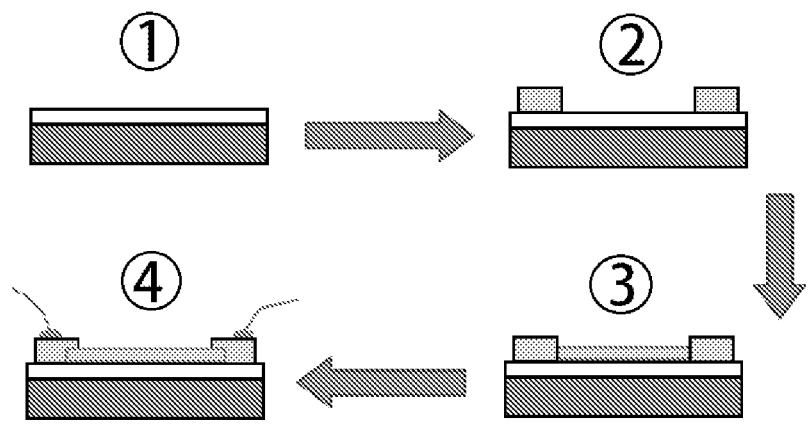
FIG. 1 shows steps in manufacturing the graphene sensor in accordance with the present invention.
Figure 2:
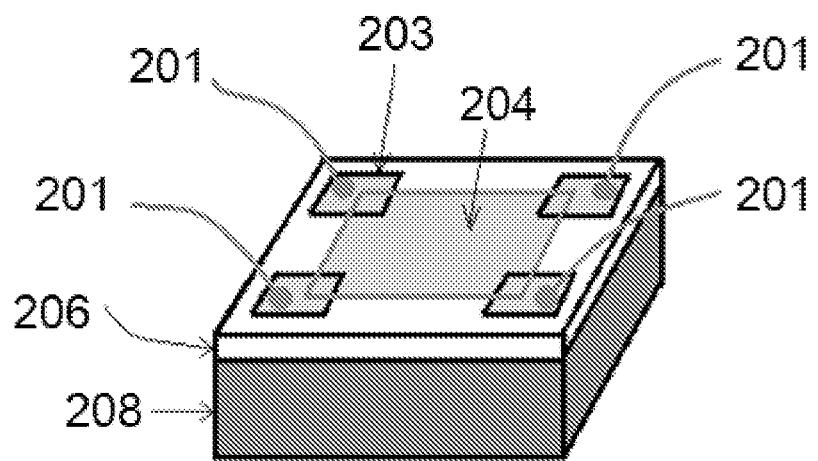
FIG. 2 is a denotation of the various layers of the graphene sensor in accordance with the present invention.

The graphene sensor being employed in the present system is manufactured as shown in FIG. 1. A single layer graphene flake is used as the sensing material, wherein the graphene flake is prepared using Metal Oxide Chemical Vapor Deposition (MOCVD) technique. The prepared single layer graphene flake is then deposited on a silicon substrate, wherein the silicon substrate comprises of four electrical contacts in order to facilitate in conducting standard four probe measurements. FIG. 1 denotes deposition of $SiO_2$ on silicon as the first step, metal deposition as the second step, graphene exfoliation and patterning as the third step, and the fourth and final step demonstrates insulation procedure and connection of wires. FIG. 2 is a denotation of the various layers of the graphene sensor in accordance with the present invention. Considering deposition of $SiO_2$ on silicon, the silicon material is used as the substrate with a thin layer of $SiO_2$ on the top for good electrical insulation. In the second step which is metal deposition, metallic electrodes in a four probe arrangement are then deposited on the $SiO_2$ layer as shown in FIG. 2, which denotes the sensor prior to insulation and packaging. 201 denotes the wires and 203 denotes a metal contact of the metallic electrode. 204 is graphene, $SiO_2$ is shown as 206 and silicon substrate is shown as 208. Metals used for deposition may include, but are not limited to, titanium-aluminum alloy or any good conducting metal.

Considering the graphene exfoliation and patterning step, this step is related to the way graphene thin layers are produced. In the present invention, the graphene 204 is produced as thin layers on the top of a copper substrate. This requires special handling of the graphene thin layer and deposition of the same, on the top of the electrodes of the sensor under preparation. The graphene 204 is then deposited and patterned to fit on the electrodes of the sensor in preparation. In the final step, insulation and wire connections are made, wherein external wire connections 201 are made to the metal contacts 203 of the sensor in preparation. Subsequent to this step, a thin layer of insulating material or varnish is deposited to cover all the electrical contacts except for a sensing window that exposes the sensing material (graphene) to an outside medium. This final step ensures no leakage of current between the established electrical contacts 203 on the sensor. After this step, the sensor is completely packaged and sealed with only a window left open on the top of the sensor exposing the graphene sensing material to the outside medium.

In an embodiment of the present invention, the proposed method may be implemented or applied using any type of sensor or detection device with a dielectric medium as the sensor environment. The material used for the sensor is the same and does not need to match any dielectric material. The same sensor will work for any dielectric medium as long as it has some ions that are free to move (or oscillate). The sensitivity of the sensor, however, will depend on the dielectric material hosting the ions and may be optimized for specific fluids such as water or oil. FIGS. 3(a) and 3(b) show a top view and bottom view, respectively, of the sensor being employed in the present invention. Subsequent to the preparation phase of the graphene sensor, the graphene sensor or layer is characterized, wherein a quality of the graphene sensor is checked or tested using Raman techniques. The Raman spectra of the graphene sensor after packaging in accordance with the present invention, is graphically denoted in FIG. 4. Considering Raman spectroscopy, the G band is a first-order Raman band of all sp2 hybridized carbon materials. The D band is a defect-activated band in sp2 hybridized carbon materials, and based on the ratio of D and G bands, an estimate regarding defect densities is obtained. The good quality 2D peak as shown in FIG. 4 indicates good graphene monolayer quality.

Figure 5:
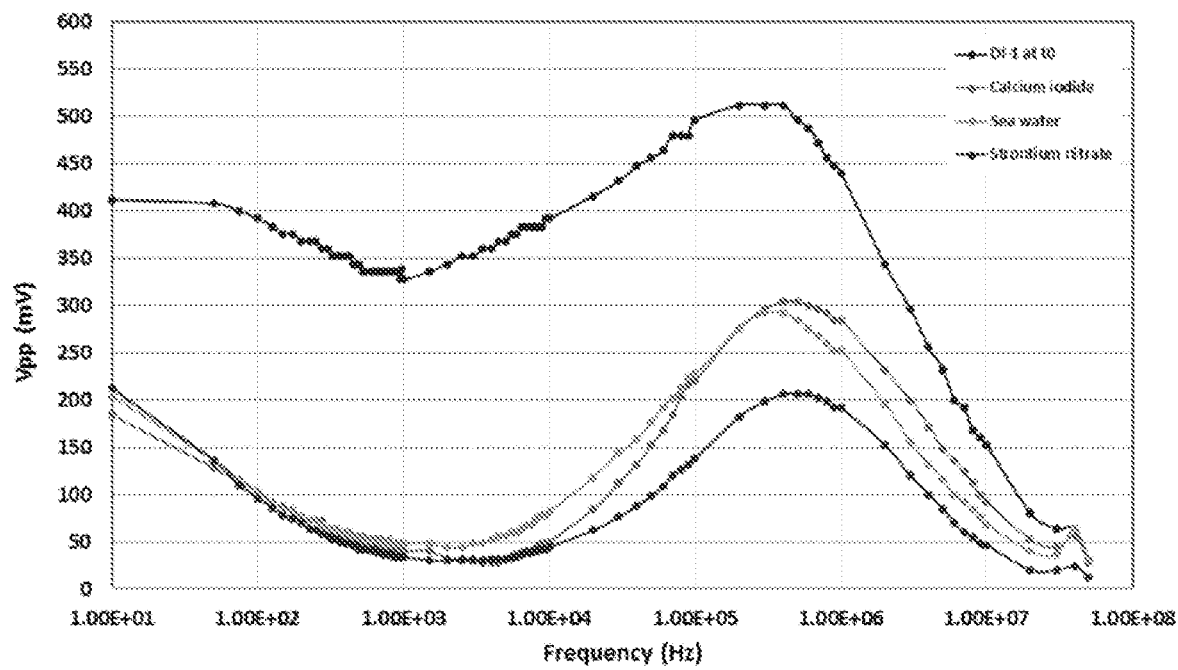
FIG. 5 graphically denotes the frequency response of a medium comprising different ions, in accordance with the present invention.

In another embodiment of the present invention, the graphene sensor is used to study frequency response of a medium comprising different ions. The frequency response is graphically depicted in FIG. 5, wherein the medium is water. FIG. 5 shows response of the graphene sensor as a function of frequency for saturated strontium nitrate, saturated calcium iodide, sea water and finally a comparison between fluids. In FIG. 5, the black curve represents a common medium for all ionic solutions considered (the solute). Considering that the host medium is deionized water (DI), this will be the reference medium and base for all of the other ionic solutions considered. This would be the case for any ionic water solution. The ions currently being monitored are all present in a water solution and this includes normal seawater—which is deionized water including many other minerals and elements. A predominant aspect of the present invention involves using dispersive effect of a fluid to fine-tune the graphene sensor to the desired or right frequency and thereafter to obtain resonance response for specific ions. On investigating the frequency response of the medium or fluid solution with different ions, the best frequency or most suitable frequency for selectively detecting and monitoring one-type ions in the fluid solution without being affected by the presence of other ions present within the fluid solution is determined.

Figure 6:
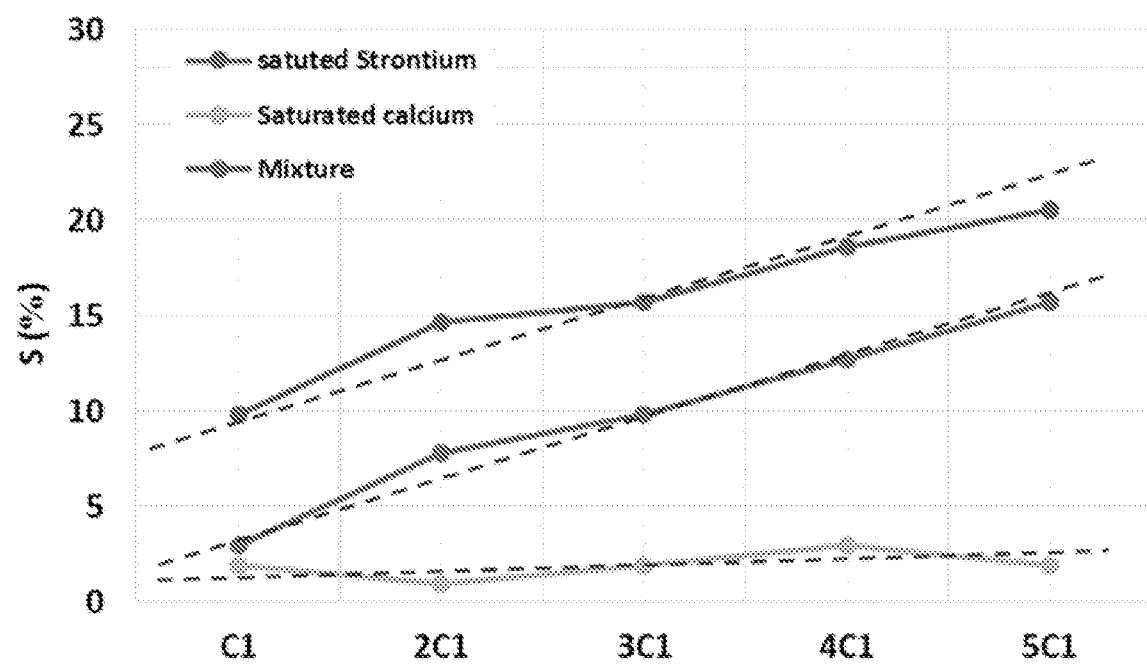
FIG. 6 depicts responses of different fluid solutions at the tuned frequency, which facilitates in selectively monitoring specific ions within a fluid solution containing many different ions.

FIG. 6 depicts responses of different fluid solutions at the tuned frequency, which facilitates in selectively monitoring specific ions within a fluid solution containing many different ions. The graphical representation of FIG. 6 denotes results from an experiment wherein continuous monitoring of saturated strontium ($Sr^{++}$) ions is performed in the presence of equal amounts of saturated calcium ($Ca^{++}$) ions in addition to a mixture of many other ions or minerals like $Na^+$ present in seawater. In an embodiment of the present invention, excitation frequency of the sensor is tuned to a specific value within the frequency band 100-200 kHz in order to selectively monitor $Sr^{++}$ ions in the presence of many other ions, which shows that the sensor may be tuned for selectively detecting specific ions within the fluid solution. As demonstrated in the above experiment, the sensor is tuned to selectively target or monitor $Sr^{++}$ ions in a seawater solution. The same graphene sensor in accordance with the present invention is tuned and used for selectively detecting different ions in the presence of many other ions in a fluid solution.

The device in accordance with the present invention may be used extensively in the oil industry for scale monitoring. The formation of scale within oil production pipelines is a common and major issue faced by oil companies since scaling occurs quickly on different areas of the multiple production lines causing drastic reductions in oil production in addition to severe damages to the plurality of temperature and pressure sensors. Other industries that require continuous scale monitoring are those employing heat exchangers, wherein scaling occurs on the inner surfaces of pipes due to water evaporation caused by heating. Such industries require continuous scale monitoring at specific locations to avoid conditions such as pressure buildups and non-effective cooling. These conditions lead to high safety risks, reduced efficiency and severe damages to the equipment. The present system and method is additionally applicable in the medical industry for health monitoring by detecting and monitoring specific ions and markers such as potassium ($K^+$) and sodium ($Na^+$) levels in the blood.

In an embodiment of the present invention, certain adjustments may be necessary on the shape or packaging of the sensor in accordance with specific field and site adaptations, which can be done at the time of device installation. Alternatively, the current system may be commercialized in standard sizes and specifications compatible with existing infrastructures of specific industries.

The present invention solves problems faced by traditional systems such as having to take samples of a fluid solution to an advanced lab in order to conduct offline chemical analysis and subsequently, having to wait long periods for the results. This transforms into a larger problem when the samples are to be extracted from remote field locations which require hours or days for shipping or transportation. Further, occurrence of repairs or interventions such as blocked pipelines, malfunctioning sensors lead to huge losses in materials and production. Hence, it is best to take measures for avoiding such mishaps, considering that immediate and sudden actions are required for safe operations and uninterrupted production. Accordingly, traditional and currently employed methods or systems are time consuming and also fail to selectively monitor selected ions in an online configuration. Further, traditionally, a first sensor is optimized to detect specific ions and a different sensor is required for monitoring different ions.

In accordance with another embodiment of the present invention, a user interface is developed and tested, which displays a graphical variation of specific ion concentrations on the screen of a host computer. This ion monitoring is done online and then displayed visually on the screen. For testing purposes, drops of saturated solutions of strontium (Sr) ions were added and accordingly an increase in the strontium concentration was observed directly on the user interface screen.

In an embodiment, the user interface graphically displays a variation of specific ion concentrations within the fluid medium, wherein the user interface is a screen on a host computer or a mobile device. In addition, selective monitoring of different ions present in the fluid medium is conducted online.

As an initial test, selective monitoring of the concentration of strontium ions in the presence of many other ions was focused on. The proposed device however may be tuned to different resonance frequencies to monitor different ions or may be used to scan and record a frequency response of an ionic solution. Accordingly the device in accordance with the present invention may be operated by either fixing the operating frequency and monitoring a specific ionic concentration, or by fixing the fluid with all its content and scan the frequency (tuning the sensor) in order to observe a medium frequency response which is the natural characteristic of its ionic composition.

In accordance with the present invention, sensor tuning refers to adjusting the operating frequency of the proposed device in order to target specific resonance of the ions in the solution. The important part of the present invention is that the sensor is tuned and not changed every time for detecting another type of ion. Accordingly there is no need to change the sensor every time. The tuning (or frequency sweep) may be done electrically or mechanically or other ways. Detection or selection of specific ions is based on tuning the system (or adjusting the operating frequency) electronically, mechanically or by any other means. The present invention involves selectively sensing different ions in a fluid containing mixed ions using any type of material, particularly graphene.

The present invention proves that the system being employed is designed to monitor different ions using a same sensor by simply tuning the sensor to monitor other ions; wherein there are no limitations regarding the number of ions the current system can detect or monitor. The range of operating frequencies of the current system may be extended as per requirement by selection of electronic components compatible with the desired operating frequency. The current limitations of electrical signal generation that can be packaged with small size footprint, is around the frequency of 5 GHz to 20 GHz for laboratory testing mostly.

In another embodiment, the proposed device requires an electrical signal generator with a variable frequency for tuning the said device. Frequency tuning range of the device will have to be within the available technology today. Generally, for ion detection most of the resonances occur in frequencies below 1 GHz which is widely available in the market. For instance, standard computers today run at frequencies 3 to 5 times higher than this.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of selectively monitoring ions in a fluid medium using a sensor, the method comprising the step of adjusting an operating frequency of the sensor to a particular resonant frequency for targeting resonance of specific ions in the fluid medium.

2. The method according to claim 1, wherein a quality of the sensor is tested using Raman techniques.

3. The method according to claim 1, wherein dispersive effect of the fluid medium is used to tune the sensor to a desired frequency, thereby obtaining resonance response for specific ions in the fluid medium.

4. The method according to claim 1, wherein monitoring of a specific ion in the fluid medium is unaffected by presence of a plurality of other ions in the said fluid medium.

5. The method according to claim 1, wherein selective monitoring of strontium (Sr++) ions is performed in the presence of the plurality of other ions in the said fluid medium.

6. The method according to claim 1, wherein the operating frequency of the sensor is tuned to a frequency within 100 to 200 kHz, for selectively monitoring strontium (Sr++) ions in the presence of the plurality of other ions in the said fluid medium.

7. The method according to claim 1, wherein the sensor is tuned to different resonant frequencies for monitoring different ions in the fluid medium, and is used to scan and record a frequency response of the fluid medium containing the plurality of other ions.

8. The method according to claim 1, wherein tuning of the sensor is done electrically or mechanically.

9. The method according to claim 1, wherein a single sensor is used for monitoring different ions in the fluid medium by simply tuning the sensor to a different frequency.

10. A device for selectively monitoring a plurality of different ions present in a fluid medium, the device comprising a graphene sensor wherein the graphene sensor is tuned to different resonant frequencies for selectively monitoring the plurality of different ions present in the fluid medium.

11. The device according to claim 10, wherein tuning the graphene sensor comprises adjusting an operating frequency of the graphene sensor.

12. The device according to claim 10, wherein resonance frequency of a dielectric medium of the fluid medium is used as excitation frequency for tuning the graphene sensor, thereby enabling the graphene sensor to selectively monitor the plurality of different ions present in the fluid medium.

13. The device according to claim 10, wherein the graphene sensor is packaged by externally exposing sensing material on top of the graphene sensor.

14. The device according to claim 10, wherein a quality of the graphene sensor is tested using Raman techniques.

15. The device according to claim 10, wherein a single sensor is used for monitoring the plurality of different ions present in the fluid medium by simply tuning the graphene sensor to a different frequency.

16. A system for selectively monitoring different ions present in a fluid medium, the system comprising:
   a graphene sensor for selectively monitoring the different ions present in the fluid medium; and
   a user interface for graphically displaying the different ions present in the fluid medium;
      wherein the graphene sensor is tuned to different resonant frequencies for selectively monitoring the different ions present in the fluid medium.

17. The system according to claim 16, wherein the graphene sensor is used to scan and record a frequency response of the fluid medium containing the different ions.

18. The system according to claim 16, wherein the user interface graphically displays a variation of specific ion concentrations within the fluid medium.

19. The system according to claim 16, wherein the selective monitoring of different ions present in the fluid medium is conducted online.

20. The system according to claim 16, wherein the user interface is a screen on a host computer or a mobile device.

* * * * *